United States Patent
Dolph et al.

(10) Patent No.: US 9,965,207 B2
(45) Date of Patent: *May 8, 2018

(54) MAINTENANCE OF CLONED COMPUTER DATA

(71) Applicant: International Business Machines Corporation, Armonk, NY (US)

(72) Inventors: Blaine H. Dolph, Western Springs, IL (US); Dean Hildebrand, San Jose, CA (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/627,798

(22) Filed: Jun. 20, 2017

(65) Prior Publication Data

US 2017/0285994 A1    Oct. 5, 2017

Related U.S. Application Data

(63) Continuation of application No. 15/396,853, filed on Jan. 3, 2017, now Pat. No. 9,720,614, which is a
(Continued)

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS 7,757,056 B1    7/2010    Fair
7,822,939 B1   10/2010    Veprinsky et al.
(Continued)

OTHER PUBLICATIONS

Method and process for configuration file name mining to clone subsystems and create new file names based on rule analysis, ip.com, IP.com No. IPCOM000203101D, IP.com Electronic Publication: Jan. 19, 2011, 6 pages.
(Continued)

*Primary Examiner* — Mano Padmanabhan
*Assistant Examiner* — Jean Edouard
(74) *Attorney, Agent, or Firm* — Schmeiser, Olsen & Watts, LLP; Michael Petrocelli

(57) ABSTRACT

A method and associated systems for efficient management of cloned data. One or more processors create a "child" clone of a "parent" software image. The child and parent contain identical information organized into identical sets of file blocks. To conserve storage, each child block initially points to a physical storage location already in use by a corresponding parent block, rather than requiring additional storage of its own. The first time a child block is updated, however, it will require additional physical storage. At the time of the child's creation, the processors reserve a number of physical blocks sufficient to store the contents of all child file blocks likely to be updated. A child file block is identified as likely to be updated by analyzing past volatility of a corresponding file block of the parent or of corresponding file blocks of other children of the same parent.

20 Claims, 4 Drawing Sheets

Related U.S. Application Data continuation of application No. 14/546,606, filed on Nov. 18, 2014, now Pat. No. 9,569,110.

(52) U.S. Cl.
CPC ............ *G06F 3/065* (2013.01); *G06F 3/0619* (2013.01); *G06F 3/0683* (2013.01)

(56) References Cited

U.S. PATENT DOCUMENTS

| | | | |
|---|---|---|---|
| 8,392,661 B1* | 3/2013 | Metcalf | G06F 13/4221 |
| | | | 711/133 |
| 8,423,733 B1 | 4/2013 | Ozdemir | |
| 8,868,503 B1* | 10/2014 | Ravichandran | G06F 17/30215 |
| | | | 707/639 |
| 9,009,106 B1 | 4/2015 | Aaron et al. | |
| 9,189,342 B1 | 11/2015 | von Thenen | |
| 9,292,327 B1 | 3/2016 | von Thenen | |
| 9,569,110 B2 | 2/2017 | Dolph et al. | |
| 2005/0246397 A1* | 11/2005 | Edwards | G06F 17/30067 |
| 2005/0246503 A1 | 11/2005 | Fair | |
| 2006/0230243 A1 | 10/2006 | Cochran et al. | |
| 2007/0260830 A1* | 11/2007 | Faibish | G06F 3/061 |
| | | | 711/162 |
| 2008/0005468 A1 | 1/2008 | Faibish et al. | |
| 2009/0327626 A1* | 12/2009 | Kaushik | G06F 11/1466 |
| | | | 711/162 |
| 2010/0122052 A1* | 5/2010 | Waldspurger | G06F 11/1438 |
| | | | 711/162 |
| 2010/0287347 A1* | 11/2010 | Cameron | G06F 12/109 |
| | | | 711/162 |
| 2010/0299368 A1* | 11/2010 | Hutchins | G06F 9/455 |
| | | | 707/803 |
| 2011/0167217 A1* | 7/2011 | Montgomery | G06F 3/0613 |
| | | | 711/114 |
| 2011/0173401 A1* | 7/2011 | Usgaonkar | G06F 3/0608 |
| | | | 711/162 |
| 2011/0246733 A1 | 10/2011 | Usgaonkar | |
| 2012/0030439 A1 | 2/2012 | Engelsiepen | |
| 2012/0066183 A1 | 3/2012 | Adkins | |
| 2012/0030904 A1 | 12/2012 | Factor et al. | |
| 2013/0054927 A1 | 2/2013 | Raj et al. | |
| 2013/0066930 A1 | 3/2013 | Kamei et al. | |
| 2013/0191350 A1* | 7/2013 | Esaka | G06F 17/30156 |
| | | | 707/692 |
| 2013/0275674 A1 | 10/2013 | Rangachari et al. | |
| 2013/0290248 A1* | 10/2013 | Fukatani | G06F 17/30212 |
| | | | 707/610 |
| 2013/0297888 A1 | 11/2013 | Yamashita et al. | |
| 2015/0199343 A1* | 7/2015 | Dabak | G06F 9/455 |
| | | | 713/189 |
| 2016/0139809 A1 | 5/2016 | Dolph et al. | |
| 2017/0147250 A1 | 5/2017 | Dolph et al. | |

OTHER PUBLICATIONS

Alex Osuna, Redbooks Paper, An Introduction to FlexClone Volumes, copyright IBM Corp. 2006, 50 pages.
Dufrasne et al., DS8000 Thin Provisioning, Redpaper, ibm.com/redbooks, Second Edition (Jul. 2014), 122 pages.
Office Action (dated May 13, 2016) for U.S. Appl. No. 14/546,606, filed Nov. 18, 2014.
Amendment (dated Jun. 25, 2016) for U.S. Appl. No. 14/546,606, filed Nov. 18, 2014.
Notice of Allowance (dated Sep. 23, 2016) for U.S. Appl. No. 14/546,606, filed Nov. 18, 2014.
Office Action (dated Feb. 28, 2017) for U.S. Appl. No. 15/396,853, filed Jan. 3, 2017.
Amendment (dated Mar. 8, 2017) for U.S. Appl. No. 15/396,853, filed Jan. 3, 2017.
Notice of Allowance (dated Mar. 27, 2017) for U.S. Appl. No. 15/396,853, filed Jan. 3, 2017.

* cited by examiner

MAINTENANCE OF CLONED COMPUTER DATA

This application is a Continuation application claiming priority to Ser. No. 15/396,853, filed Jan. 3, 2017, which is a continuation of Ser. No. 14/546,606, filed Nov. 18, 2014, U.S. Pat. No. 9,569,110, issued Feb. 14, 2017.

TECHNICAL FIELD

The present invention relates to efficiently managing cloned copies of digital data.

BACKGROUND

Cloning data can be an efficient way to duplicate a file, disk volume, virtual machine, operating environment, or other type of stored data source. A clone of a data source is an exact copy of the entity at a particular time. Cloning a data source, however, may not be an efficient use of storage if each clone is allocated the same amount storage space that is required by the original entity.

In a multi-user computer network, such as an enterprise network or a cloud-computing platform, multiple users may be provided with a similar or identical software environment, database, or other software entity. Users of a transaction-processing system, for example, may each be given access to an identical instance of a standardized transaction database, users of a cloud-computing service may each work within an identically configured virtual machine, and users associated with a particular security level may each be allowed access to a standardized set of resources associated with that particular level.

One way to simplify the provisioning and management of such computing environments is to use cloning to quickly duplicate a known a file, disk volume, virtual machine, operating environment, or other type of stored data source that will be provided to multiple users.

In one example, a cloning methodology may provide a standardized virtualized operating environment to every user of a cloud-computing platform. Here, a cloning tool may be used to quickly create an exact copy—or "clone"—of the original standardized environment. This resulting "parent" clone is a fixed snapshot from which an identical "child" clone copy may be created for each user added to the cloud. Although the cloned child environments associated with the new users are initially identical, each user may subsequently alter or customize his or her cloned environment in any way allowed by a system administrator.

One advantage of known cloning methodologies is that, because all clones are identical, there may be no need to initially allocate distinct areas of physical storage to each clone. If, for example, a cloned parent requires 1 GB of storage space, each cloned child may initially point to the data stored in the identical cloned parent, rather than requiring an additional 1 GB of its own preallocated physical storage. In this way, many child clones may share the same area of physical storage space and the same data stored in that storage space.

This efficiency, however, lasts only until a user updates the data stored in his or her cloned child. Because each update may create unique data that differs from corresponding data comprised by the parent clone, this unique, updated data must be stored in a distinct, previously unallocated, physical storage location. Thus, every time a user updates or otherwise alters the original child cloned image, additional physical storage must be allocated on demand to store the updated or altered information.

One problem created by this method of allocating physical storage on demand is that on-demand allocation may prevent an administrator from accurately estimating how much physical storage to preallocate to a newly cloned child. In the above example, a user who repeatedly updates only a small portion of his or her cloned image may over time require a relatively small amount of additional physical storage space. But a user who routinely makes sweeping changes to a large portion of his or her cloned image may eventually require nearly the entire 1 GB of additional physical storage. This unpredictability may hamper an administrator's attempts to efficiently manage storage resources.

Another problem is that an on-demand method of physical storage allocation generally increases the difficulty of allocating storage that is contiguous or that resides on a single volume. Such a problem may occur when a user creates a need for additional physical storage by updating his or her cloned image, but no physical storage is available that is contiguous with storage space already allocated to the user's clone, or that resides on the same volume as physical storage space already allocated to the user's clone. Because data scattered across multiple, noncontiguous areas of physical storage medium, or stored on multiple volumes, may take longer to access, this problem can adversely affect system performance.

BRIEF SUMMARY

A first embodiment of the present invention provides a method for efficient management of cloned data, the method comprising:

one or more processors of a computer system receiving a request to update a first data element of a first child clone, wherein the first child clone is a cloned copy of a parent clone, wherein the parent clone is a cloned copy of a source software image, wherein information comprised by the first child clone is organized into a set of child file blocks and information comprised by the parent clone is organized into a set of parent file blocks, wherein a first child file block of the set of child file blocks identifies the first data element and further identifies that the first data element is stored in a first block of physical storage of a set of physical blocks, and wherein a first parent file block of the set of parent file blocks identifies a second data element and further identifies that the second data element is stored in a second block of physical storage of the set of physical blocks;

the one or more processors determining that the first data element and the second data element are identical and that the first block of physical storage and the second block of physical storage identify a same physical storage location;

the one or more processors identifying a first preallocated block of physical storage of the set of physical blocks that is large enough to store the updated first data element;

the one or more processors storing the updated first data element in the first preallocated block of physical storage; and the one or more processors updating the first child file block to identify that the updated first data element is stored in the first preallocated block of physical storage.

A second embodiment of the present invention provides a computer program product, comprising a computer-readable hardware storage device having a computer-readable program code stored therein, said program code configured to be executed by a processor of a computer system to implement a method for efficient management of cloned data, the method comprising:

The one or more processors receiving a request to update a first data element of a first child clone, wherein the first child clone is a cloned copy of a parent clone, wherein the parent clone is a cloned copy of a source software image, wherein information comprised by the first child clone is organized into a set of child file blocks and information comprised by the parent clone is organized into a set of parent file blocks, wherein a first child file block of the set of child file blocks identifies the first data element and further identifies that the first data element is stored in a first block of physical storage of a set of physical blocks, and wherein a first parent file block of the set of parent file blocks identifies a second data element and further identifies that the second data element is stored in a second block of physical storage of the set of physical blocks;

the one or more processors determining that the first data element and the second data element are identical and that the first block of physical storage and the second block of physical storage identify a same physical storage location;

the one or more processors identifying a first preallocated block of physical storage of the set of physical blocks that is large enough to store the updated first data element;

the one or more processors storing the updated first data element in the first preallocated block of physical storage; and the one or more processors updating the first child file block to identify that the updated first data element is stored in the first preallocated block of physical storage.

A third embodiment of the present invention provides a computer system comprising a processor, a memory coupled to said processor, and a computer-readable hardware storage device coupled to said processor, said storage device containing program code configured to be run by said processor via the memory to implement a method for efficient management of cloned data, the method comprising:

The one or more processors receiving a request to update a first data element of a first child clone, wherein the first child clone is a cloned copy of a parent clone, wherein the parent clone is a cloned copy of a source software image, wherein information comprised by the first child clone is organized into a set of child file blocks and information comprised by the parent clone is organized into a set of parent file blocks, wherein a first child file block of the set of child file blocks identifies the first data element and further identifies that the first data element is stored in a first block of physical storage of a set of physical blocks, and wherein a first parent file block of the set of parent file blocks identifies a second data element and further identifies that the second data element is stored in a second block of physical storage of the set of physical blocks;

the one or more processors determining that the first data element and the second data element are identical and that the first block of physical storage and the second block of physical storage identify a same physical storage location;

the one or more processors identifying a first preallocated block of physical storage of the set of physical blocks that is large enough to store the updated first data element;

the one or more processors storing the updated first data element in the first preallocated block of physical storage; and the one or more processors updating the first child file block to identify that the updated first data element is stored in the first preallocated block of physical storage.

DETAILED DESCRIPTION

Figure 1:
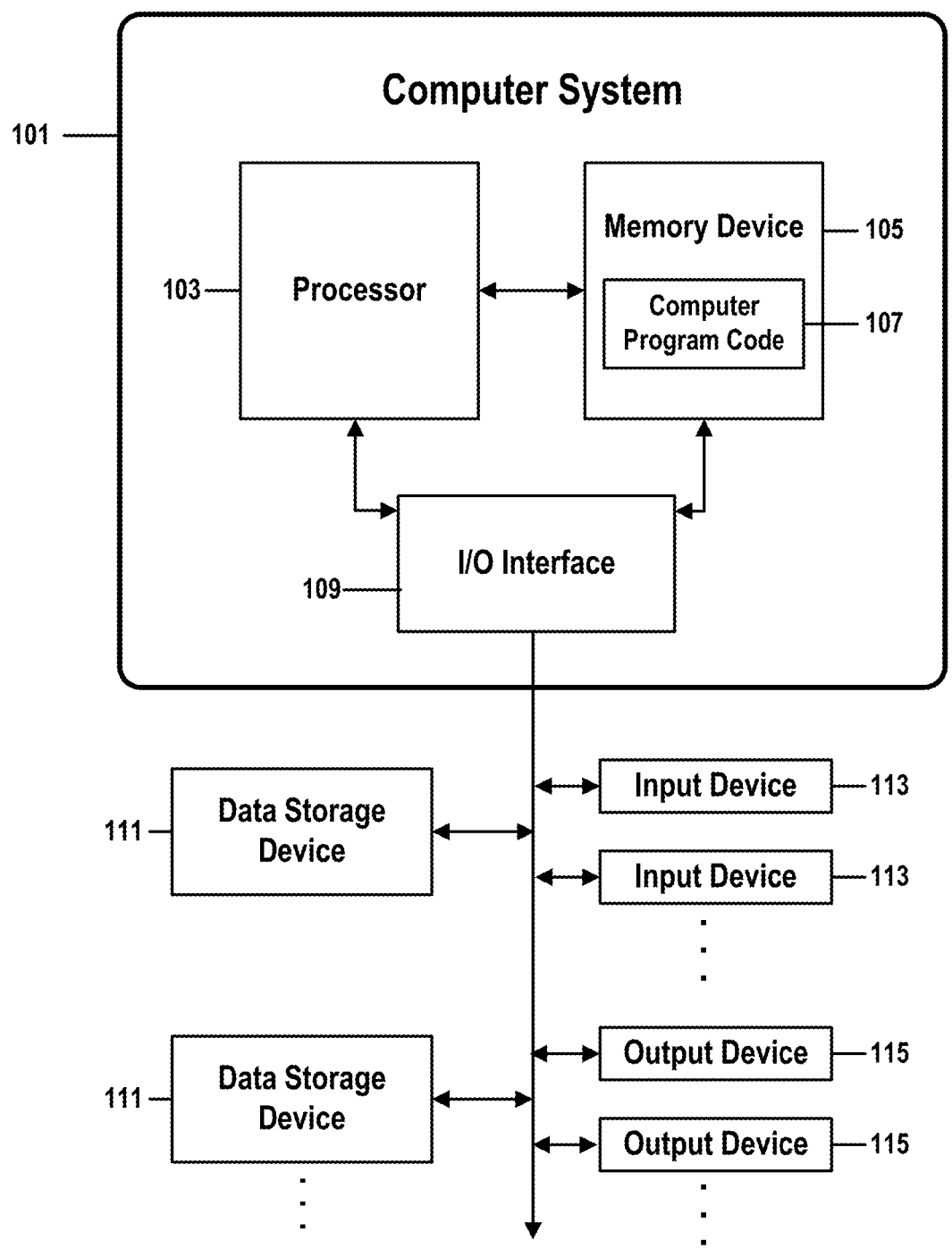
FIG. 1 shows the structure of a computer system and computer program code that may be used to implement a method for efficient management of cloned data in accordance with embodiments of the present invention.

As described in the BACKGROUND section above, cloning may help system administrators and managers more efficiently manage computer networks, communications platforms, and other types of multi-user electronic or computerized environments. Cloning, however, is not a panacea and traditional methods of cloning may make it difficult for an administrator or manager to project future storage requirements of users to whom cloned images are provided.

Embodiments of the present invention provide technical advantages that mitigate some or all of the adverse effects of these problems.

Embodiments of the present invention comprise steps of a method in which one or more processors of a computerized system create a "parent" clone of an original data source, and further create one or more "child" clones of the parent. In one scenario, each child clone is created in response to a request from a new user, or in response to a request by an administrator to provide to a user a standardized application, operating environment, or other image comprised by the original data source.

In some embodiments, a child clone may be created as a direct clone copy of the original data source, and such an embodiment may not include a step of creating a distinct parent clone from which child clones are spawned.

As described above, the parent clone and each child clone are exact logical copies of the original data source at the moment that the parent clone was created. For purposes of illustration, this document describes each clone as comprising a set of logical blocks that is identical to a set of logical blocks of the original data source at the time that the parent clone is created. Each logical block contains information that is distinct to that block and that is stored in a distinct area of physical storage. For purposes of illustration, this document describes such physical storage as comprising a set of physical blocks.

In a more general case, an original data source may comprise a set of "file blocks" that are comprised by files, applications, images, or other data entities of the original data source. In such embodiments, each file block may be represented by one or more logical blocks of storage that are maintained by a file system or other operating software. Each logical block may in turn be represented by one or more physical blocks of storage, which identify actual locations of storage on a disk platter, magnetic tape, solid-state device, or other type of storage device.

Examples presented in this document describe embodiments in which file blocks, logical blocks, and physical blocks are equal in size and thus map onto each other in a one-to-one or one-to-many relationship. These examples should not be construed to limit embodiments of the present invention to such relationships, and in some embodiments, file blocks, logical blocks, and physical blocks may not be the same size and one file block might, for example, identify data that is stored in a dozen physical blocks, or two file blocks might both be stored in a single physical block.

Examples cited in this document describe, for illustrative purposes, implementations in which there is a one-to-one relationship between a set of file blocks comprised by a clone and a set of logical blocks of storage that store information identified by the file blocks, and there is a one-to-one relationship between the set of logical blocks and a set of physical blocks that identify physical locations on a storage device or medium that physically stores information identified by corresponding logical blocks or file blocks.

For example, in a system in which a file block, logical block, and physical block each can store 1 MB of data, two 20 MB disk drives D0 and D1 might each respectively contain ten physical blocks <D0PB00> . . . <D0PB09> and <D1PB00> . . . <D1PB09>. In this example, the physical blocks are labeled according to the convention <DxPBy>, where x identifies a physical storage device and y identifies a particular physical block on that storage device.

Here, a file system might associate each of these physical blocks with a logical block LB00 . . . LB19, where, for example, the file system represents physical block D0PB01 as logical block LB01 and represents physical block D1PB09 as logical block LB19. Because, in this example, physical and logical blocks are the same size, 20 logical blocks represent 20 physical blocks.

In this example, a first 2 MB file File1 might comprise two file blocks F100 and F101 and a second 2 MB file File2 might comprise two file blocks F200 and F201. Depending on implementation-dependent details, file blocks F100 and F101 of File1 might refer to logical blocks LB07 and LB11, which in turn might identify data stored in physical blocks D0PB07 and D1PB01. File2's file blocks F200 and F201 might respectively identify logical blocks LB10 and LB12 and corresponding physical blocks D0PB10 and D1PB02.

Although each file block can refer to no more than one logical block and each logical block can refer to no more than one physical block, the converse is not true. If three logical blocks, for example, contain identical data, it is possible to conserve physical storage space if all three logical blocks refer to a single block of physical storage. This technique allows file blocks of a newly created clone to conserve physical storage by referring to the physical blocks that store the identical data comprised by a source data entity from which the clone was created.

This resource savings lasts only so long as a clone continues to store data identical to that of the source data entity. Although every clone initially contains an identical set of logical blocks, once a user begins updating his or her cloned copy, the information contained in these blocks may change.

In one example, if all child and parent clones of a system initially contain a set of 1024 logical blocks LB0000 through LB1023, a child clone's instance of these 1024 blocks will initially contain information identical to that contained in the parent clone's instance of blocks LB0000 through LB1023. Furthermore, the child clone's instance of these 1024 logical blocks may either correspond to 1024 distinct physical blocks or, more likely, will conserve physical storage space by pointing to the same 1024 physical blocks that store the parent clone's identical information.

Over time, however, user activity may change the contents of at least some of the child clone's logical blocks. If this occurs, the child clone will still be organized into the same set of logical blocks LB0000 through LB1023, but some or all of these blocks will no longer contain information identical to that contained by corresponding blocks of the parent clone. Such blocks can thus no longer merely point to physical blocks of the parent clone and must be associated with new physical blocks that will store information different from that of the parent clone.

In one example, a parent clone comprises 1,024 logical blocks LB0000 through LB1023 that each identifies data stored in one of 1,024 corresponding physical blocks PB0000 through PB1023 of an original source data entity. If this parent clone had been allocated physical storage in a conventional manner, its 1,024 logical blocks would have consumed a second set of 1,024 physical blocks PB2000 through PB3023. Because the original source entity and the parent clone store identical data, this storage method would be wasteful. But if each logical block of the parent clone merely points to a physical block of the original source data entity, the clone does not require initial allocation of 1,024 new physical blocks.

In this example, each time an administrator clones a new child of the parent clone for a new user, that new child will be organized into 1,024 logical blocks LB0000 through LB1023 that contain data identical to those of the original template disk image and that point to the same set of physical blocks PB0000 through PB1023.

In some embodiments, the parent clone may be allocated its own distinct set of physical blocks PB2000 through PB3023, even though doing so requires the allocation of additional storage. This may be useful when the organization, structure, or content of the original source entity is not static. Such an approach allows the parent clone to serve as a static, standardized master image for all cloned children, regardless of whether the original source data entity undergoes update or revision.

In this final class of embodiments, physical storage may still be conserved if logical blocks of each child clone initially refer to the physical blocks PB2000 through PB3023 of the parent clone. In these embodiments, such a savings may be realized if each logical block of a newly created child points to a physical block of the parent clone, rather than to a distinct physical block allocated specifically to the child.

Embodiments of the present invention further provide an advantage over existing cloning methodologies by circumventing the previously described problem of accurately estimating a number of physical blocks to preallocate to a newly cloned child. This problem arises because existing cloning methodologies employ an on-demand storage-allocation scheme in which the child clone requests allocation of a new physical block each time additional storage is necessitated by a user activity. If a system does not preallocate (or reserve) sufficient storage for the child at the time of the child's creation, a physical block may not be available when the child requires it. But if the system preallocates too many blocks at the time of the child's creation, the unneeded blocks will become unnecessarily unavailable to other users and applications.

Embodiments of the present invention mitigate this potentially wasteful result by using a novel series of steps to predict a likely number of physical blocks that will be required over time by a newly created child.

Embodiments of the present invention further mitigate the previously mentioned performance degradation inherent to traditional cloning methodologies that do not facilitate efforts to allocate all of a child clone's physical blocks to a single storage volume or to contiguous regions of physical storage.

Because embodiments of the present invention more reliably predict a likely number of physical blocks that will be required over time by a newly created child clone, such embodiments allow an administrator to preallocate or reserve an area of storage at the time of the child's creation such that this preallocated area of storage is likely to reside on a single volume or in a contiguous region of physical storage, without unduly wasting storage by preallocating physical blocks that have a lower probability of being required in the future.

FIG. 1 shows a structure of a computer system and computer program code that may be used to implement a method for efficient management of cloned data in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for efficient management of cloned data in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, non-removable, read-only storage medium such as a Read-Only Memory (ROM) device 105, or may be accessed by processor 103 directly from such a static, non-removable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for efficient management of cloned data.

Any of the components of the present invention could be created, integrated, hosted, maintained, deployed, managed, serviced, supported, etc. by a service provider who offers to facilitate a method for efficient management of cloned data. Thus the present invention discloses a process for deploying or integrating computing infrastructure, comprising integrating computer-readable code into the computer system 101, wherein the code in combination with the computer system 101 is capable of performing a method for efficient management of cloned data.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown)

and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
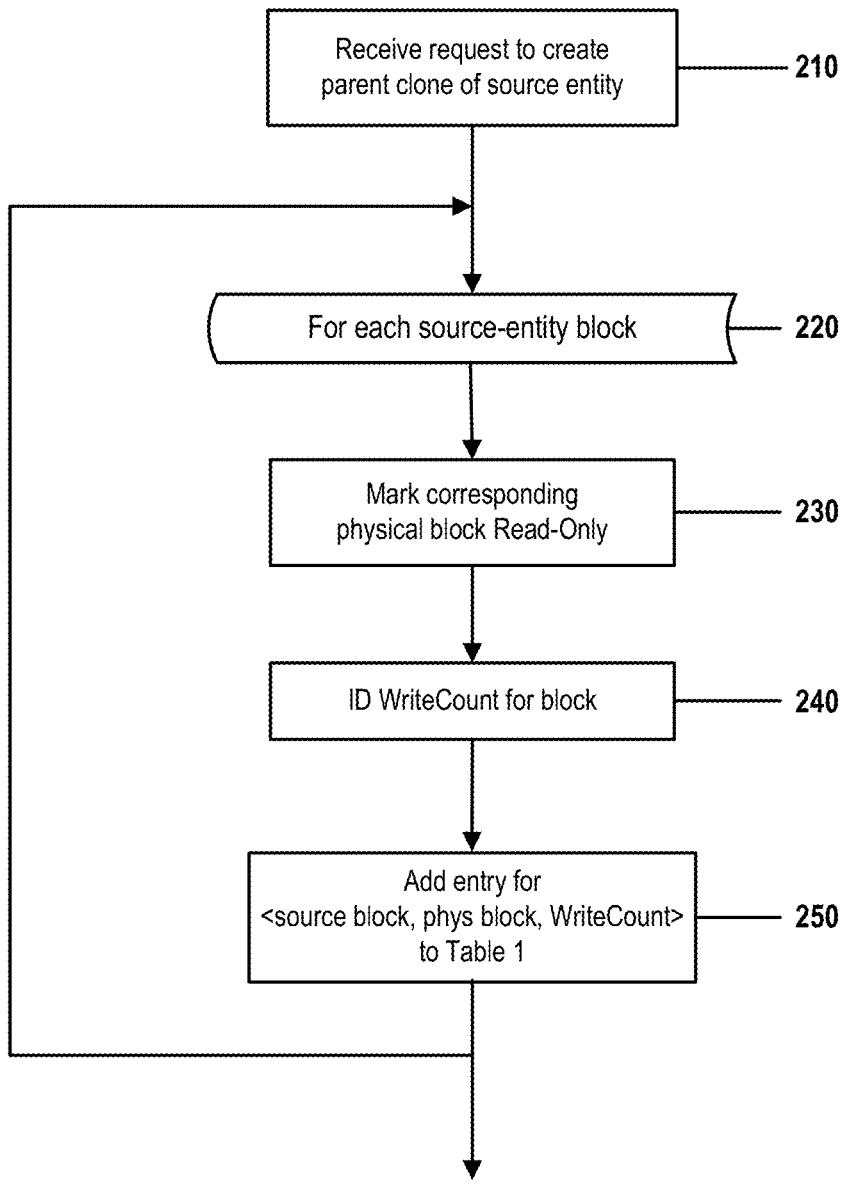
FIG. 2 is a flow chart that illustrates a method of creating a parent clone of a data source in accordance with embodiments of the present invention.

FIG. 2 is a flow chart that illustrates a method of creating a parent clone of a data source in accordance with embodiments of the present invention. FIG. 2 comprises steps 210-250

In step 210, one or more processors of a computer system receive a request to create a "parent" clone of a "source" software or data entity. As described above, this source may comprise any set of stored data, configuration settings, resource characteristics, or other logical or software content, such as a database image, a disk image, a virtual machine, or an operating environment.

The parent clone will comprise an exact duplicate of the source entity at the time that the clone is created. If, for example, a source comprises a volume of a hard drive, the parent clone will comprise a "snapshot" of each file, folder, setting, and other entities that characterize or are stored on the volume at the moment of the snapshot, such that the snapshot contains sufficient information to create an essentially perfect copy of the volume at the time of the creation of the parent clone.

Data stored in the parent clone may be organized into a set of file blocks that each refer to information identified by a logical block identified by a distinct address. Each such logical may in turn identify an area of physical storage that physically stores the information associated with the corresponding logical block and file block. In this document, each area of physical storage is referred to as a physical block, and each physical block is identified by a distinct address.

By definition, if a source entity comprises a set of file blocks or logical blocks that each identify a data element comprised by the source entity, a clone of that source entity will comprise the same set of file blocks or logical blocks and each block of the clone's set or sets will identify the same element of data identified by the corresponding file block or logical block of the source entity.

Similarly, if a parent clone comprises a set of file blocks or logical blocks that each identify a data element comprised by the parent clone, a child clone of that parent clone will comprise the same set of file blocks or logical blocks and each block of the child clone's set or sets will identify the same element of data identified by the corresponding file block or logical block of the parent clone.

Step 220 begins an iterative process of steps 220-250, which is performed once for each file block of the source entity. In some embodiments, the iterative process of steps 220-250 might instead be performed once for each file block of the parent clone. In some embodiments, including certain exemplary embodiments described below, the iterative process of steps 220-250 might be performed once for each logical block of the source entity and once for each logical block of the parent clone. In many cases, all three of these methods express identical procedures.

Each iteration of the iterative process of steps 220-250 thus identifies, organizes, and tabulates information about a file block or logical block of either the source entity or of the parent clone copy of the source entity. In the examples described here, we refer to each such tabulation of a single block as occupying a row of data of a "Table 1," but embodiments of the present invention may comprise any other method or means of tabulating such information known to those skilled in the art. Such methods or means may comprise, but are not limited to, an indexed database, a spreadsheet worksheet, a flat file, a free-form listing, or combinations thereof.

In the example of FIG. 2, each row of Table 1 comprises the columns

| FileName | File Block | Physical Block | WriteCount |
| --- | --- | --- | --- |

Here, each entry in the "FileName" column identifies a data entity characterized by other fields of the same row. If, for example, the FileName column of a first row identifies a source entity, then the other fields of that first row describe blocks comprised by the source entity. Similarly, if the FileName column of a second row identifies a parent clone, then the other fields of that second row describe blocks comprised by the parent clone.

Each entry of the "File Block" column identifies a particular file block of an entity identified by the corresponding "FileName" entry. Because the set of file blocks comprised by the parent clone is identical to the set of file blocks comprised by the source entity, each file block in the set of file blocks may be identified in two distinct rows in Table 1, a first entry for a first instance of that file block comprised by the source entity and a second entry for a second instance of that file block comprised by the parent clone.

Each entry of the "Physical Block" column identifies a distinct physical block or blocks of a storage medium or device that stores information identified by the corresponding file block.

In one example, a row:

TABLE 1

| FileName | File Block | Physical Block | WriteCount |
|---|---|---|---|
| ParentClone1 | FB0403 | PB7271 | 10 | identifies information associated with file block FB0403 of parent clone ParentClone1 is stored in physical block PB7271.

Each entry of the "WriteCount" column identifies a WriteCount parameter associated with the file block (or logical block) identified in the same row. A value of the WriteCount parameter associated with a particular block indicates a likelihood that the block will be revised or rewritten or that data stored in a corresponding physical block will be revised.

A WriteCount value associated with a particular block may be determined by any means known to those skilled in the art or may be determined as a function of implementation-dependent factors system that may comprise, but are not limited to, hardware or software constraints; a performance, financial, or efficiency goal; or an other factor specific to a particular embodiment or implementation.

A WriteCount value may, for example, identify, or be derived as a function of, a frequency at which, or of a total number of times that, information identified by a file, logical, or physical block has been revised during a prior duration of time. It may identify or be a function of a frequency at which, or of a total number of times that, a block has been revised during a certain period of time as a result of a specific user's activity related to only previously one cloned image. If multiple entities share a logical or physical block, a WriteCount value may be a function of a frequency at which, or of a cumulative number of times that, the block has been revised during a certain period of time as a result of user revisions to any of the cloned entities that have in the past shared that block. Embodiments of the present invention may use combinations of many other types of calculations that satisfy other types of technical or business goals and requirements.

Figure 3:
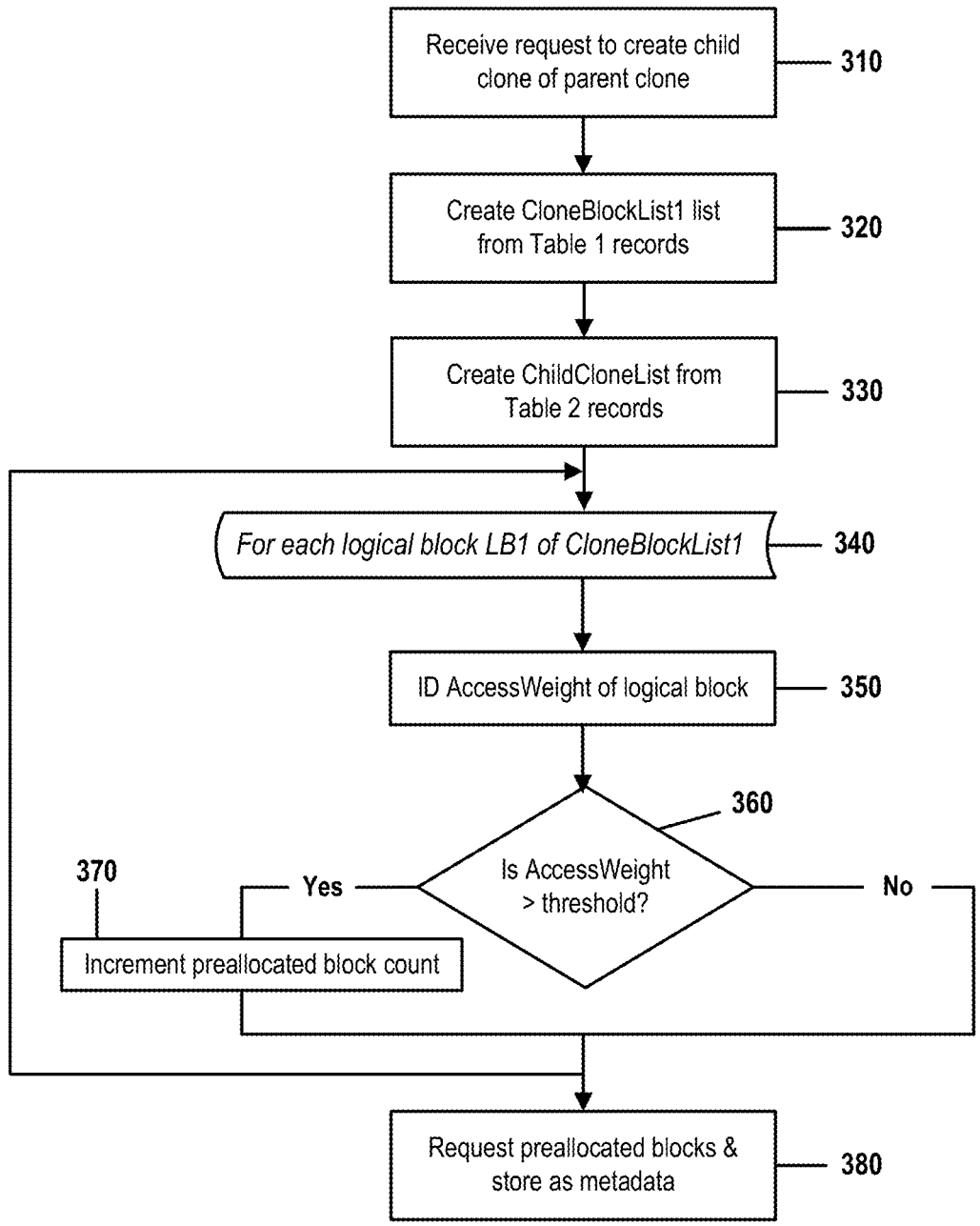
FIG. 3 is a flow chart that illustrates a method of creating a child clone of a parent clone in accordance with embodiments of the present invention.
Figure 4:
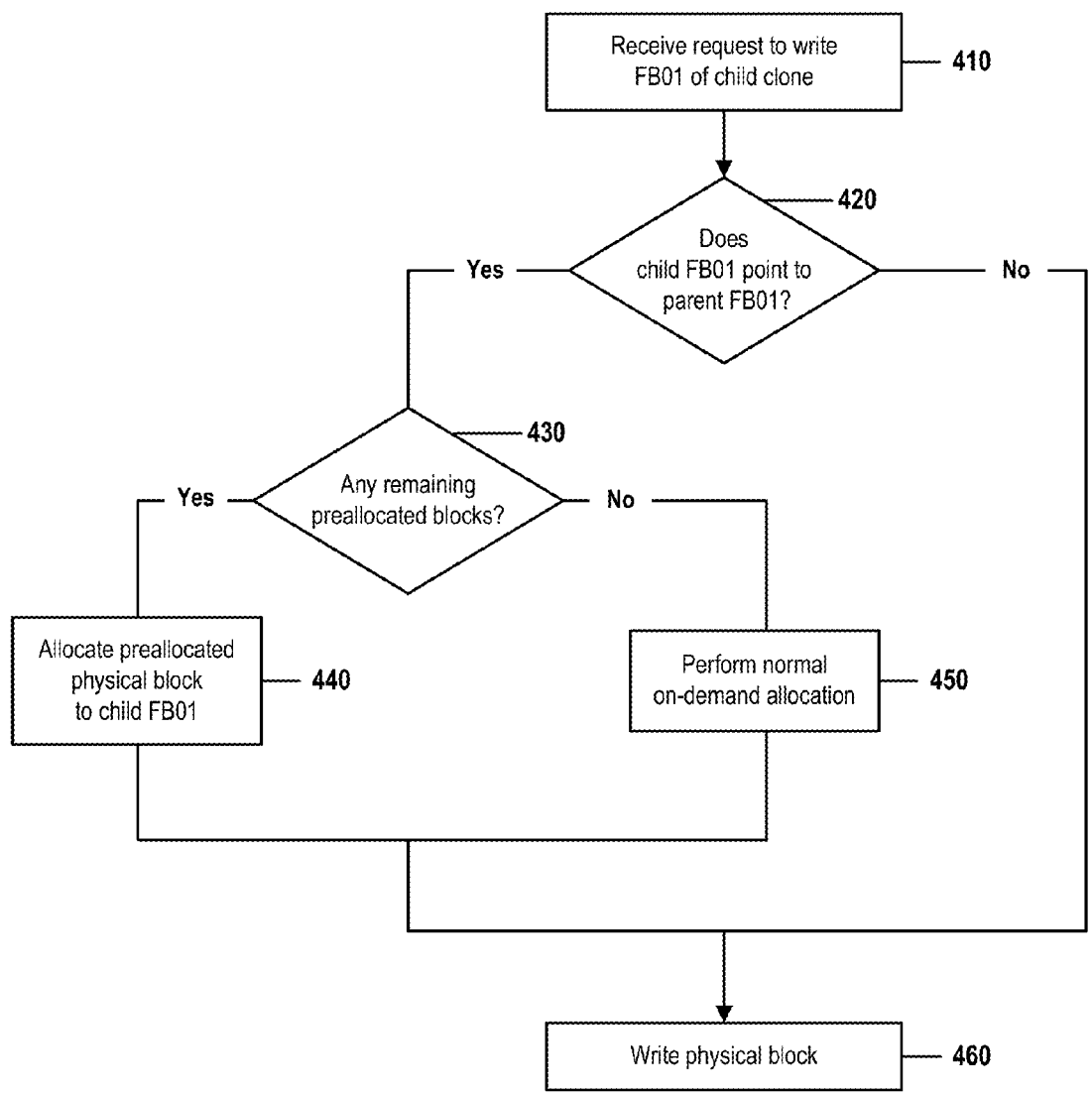
FIG. 4 is a flow chart that illustrates a method of updating file block of a child clone that was previously created in accordance with embodiments of the present invention.

The examples of FIGS. 2-4 describe a WriteCount parameter that identifies a likelihood that a file block may be revised. These examples should not be construed to limit the WriteCount parameter to such configurations.

Information from which a value of the WriteCount parameter may be determined may be derived from any source available to system administrators, information-technology professionals, or other entities responsible for managing a computerized system. Such a source may comprise an operating-system's file-system tables; a logging mechanism of an application, an operating environment, a virtualization layer of a cloud-computing platform, or a hardware component; or any other known means of managing or recording storage data.

In step 230, the one or more processors identify, if they have not already done so, a physical block that stores information associated with the logical block of the source entity currently being considered by the iterative process of steps 220-250. The one or more processors then mark this physical block as being read-only. This step prevents the physical block from being further updated during a performance of remaining steps of the method of FIG. 2.

In step 240, the one or more processors determine a value of the WriteAccess parameter for the file block or logical block identified by the corresponding column entry or entries of the same row of Table 1. As described above, this determining a value may be performed by any combination of known or implementation-dependent methods.

In some embodiments, a row entry of Table 1 may identify both a file block and its corresponding logical block. In other embodiments, additional information may be identified by each row entry of Table 1. In all cases, each row of Table 1 identifies a WriteCount value associated with a file block or a logical block of one file, where that WriteCount value is a characteristic of a physical block associated with the file block or the logical block.

In step 250, the one or more processors create a new row entry in Table 1 that contains the information identified during the current iteration of the iterative process of steps 220-250. This new row entry comprises information that identifies: a file, source entity, parent clone, child clone, or other software entity; a file block, logical block, or both file and logical blocks, of the software entity; a physical block that stores information associated with the identified file block or logical block; and a WriteAccess value that identifies past or future volatility of data identified by the identified file block, logical block, or physical block.

At the conclusion of step 250, the next iteration of the iterative process of steps 220-250 begins. This next iteration considers the next block comprised by either the source entity (or, equivalently, the parent clone). If all blocks of the source entity (or, equivalently, all blocks of the parent clone) have been considered by iterations of the iterative process, then the method of FIG. 2 ends.

At the conclusion of the method of FIG. 2, Table 1 will have been populated with a row entry for every file block of the source entity and for every file block of the parent clone.

A simplified example of such a populated table is shown below.

| FileName | File Block | Physical Block | WriteCount |
|---|---|---|---|
| SourceFile1 | FB0 | PB100 | 10 |
| SourceFile1 | FB1 | PB101 | 101 |
| ParentFile1 | FB0 | Pointer to parent | 10 |
| ParentFile1 | FB1 | Pointer to parent | 101 |

Here, the source entity SourceFile1 and the parent clone ParentFile1 each comprise two file blocks FB0 and FB1. Table 1 identifies that file block FB0 of source entity SourceFile1 is associated with data stored in physical block PB100 and that file block FB1 of source entity SourceFile1 is associated with data stored in physical block PB101.

This exemplary Table 1 further identifies a WriteCount value of 10 associated with historical rewrite characteristics of physical block PB100 (and thus for file block FB0 of SourceFile1) and a WriteCount value of 101 associated with historical rewrite characteristics file block FB1 of SourceFile1 and for physical block PB101. These WriteCount values may indicate that physical block PB101 has been revised many more times than physical block PB100, or that physical block PB101 is much more likely to be revised in the future than is physical block PB100. Consequently, these WriteCount values indicate that file blocks and logical blocks that refer to physical block PB101 are more likely to be revised in the future than are file blocks and logical blocks that refer to physical block PB100.

Table 1 further identifies that file block FB0 of newly created parent clone ParentFile1 is associated with a pointer that points to the corresponding physical block (here, PB100) associated with file block FB0 of source entity SourceFile1. This means that the instance of file block FB0 of the parent clone shares the contents of physical block PB100 with source entity SourceFile1. This is possible only so long as file block FB0 of the newly created parent clone continues to comprise data identical to that contained in corresponding file block FB0 of the source entity.

Similarly, file block FB1 of parent clone ParentFile1 is associated with a parent pointer to the corresponding physical block FB1 (via an intermediate logical block) associated with file block FB1 of source entity SourceFile1.

Because both instances of file block FB0 are associated with the same physical block PB100, both instances of FB0 are characterized by the same WriteCount value of 10, and because both instances of file block FB1 are associated with the same physical block PB101, both instances of FB1 are characterized by the same WriteCount value of 101.

FIG. 3 is a flow chart that illustrates a method of creating a child clone cloned from a parent clone in accordance with embodiments of the present invention. FIG. 3 comprises steps 310-380.

In step 310, the one or more processors receives a request to create a child clone of the parent clone file (in this example, a disk image or file arbitrarily named "Parent-Clone") created by a method of FIG. 2. As in step 210 of FIG. 2, this request may be received by any means known to those skilled in the art.

In response to this request, the one or more processors clone the parent clone to create a new child clone by means known to those skilled in the art. In embodiments described herein, the newly created child comprises a set of file blocks that correspond to file blocks comprised by the parent clone. Each file block of either the parent's or the child's set of file blocks identifies data stored at a logical location identified by an address of a logical block, where a logical block is a virtual storage location that is managed by a file system or other operating software.

Because each file block of the newly created child clone identifies data that is an exact copy of data identified by a corresponding file block of the parent clone, a child file block and its corresponding parent file block may identify a same logical block or a same physical block of storage. Analogous relationships may exist between a corresponding pair of logical blocks. A first logical block associated with a parent clone and a corresponding second logical block associated with a child clone of the parent clone may both refer to a same physical block of storage.

At the conclusion of step 310, the one or more processors will have created a child clone that comprises data identical to data comprised by the parent. Furthermore, the child clone's data may be organized into a set of file blocks or logical blocks that are identical to those of the parent and that refer to the same physical storage locations as do the file or logical blocks of the parent. Because the child still shares physical storage with its parent, no additional physical blocks will have yet been preallocated or reserved for the newly created child.

In step 320, the one or more processors reviews entries of Table 1, which may have been created by means of the method of FIG. 2. These entries identify physical blocks associated with file blocks or logical blocks of cloned parent entity ParentClone. In order to simplify the following examples, we will refer to these file blocks or logical blocks as "logical blocks," but readers should remember that different embodiments may perform similar functions on file blocks, logical blocks, or both.

During this review of Table 1 entries, the one or more processors identify and select a subset of this set of logical blocks, where each selected logical block of the subset is associated with a physical block that is more likely to be updated.

In embodiments in which each logical block may refer to one and only one physical block, this selection also identifies logical blocks that are in the future more likely to require an allocation of additional physical storage. This occurs because, as explained above, although each logical block of a newly created child clone may initially point to a physical block of storage already allocated to its parent, when the contents of that logical block are revised, the logical block must be updated to identify a different, distinct physical block able to store the revised data.

In some embodiments, a logical or physical block may be determined to be more likely to require a future allocation of additional physical storage as a function of a value of the WriteCount parameter associated with that physical block, or with a corresponding file block or logical block.

In some cases, this function may be as simple as determining whether the WriteCount value exceeds a threshold. In such an implementation, the one or more processors might, for example, select physical blocks associated with file blocks or logical blocks that have been rewritten in the past more frequently than a predetermined threshold frequency, or that have been rewritten a number of times greater than a value of a predetermined threshold number of times.

In some embodiments, the one or more processors may employ more complex functions or combinations of functions to identify those file blocks or logical blocks of the child clone that are likely to be volatile. These functions may be defined or selected as a function of expert knowledge of the system underlying a particular embodiment, or as a function of means known to those skilled in the art of systems management or maintenance, statistical analysis, or information technology. In some cases, these more complex functions may be based on implementation-dependent or business-dependent factors or constraints, or may be based on methods known to those skilled in the art for determining how likely it is for a particular data element to undergo revision. In some cases, such a function may be determined and fine-tuned iteratively by observing how effectively variations of the function perform in a real-world production environment.

In one example, expert knowledge might lead to an assumption that a first file block containing data identifying a user's account number should be deemed less volatile than a second file block that contains data identifying characteristics of the user's most recent purchase. In other examples, the one or more processors may arrive at the same conclusion by instead determining that the first file block is associated with a much smaller value of the WriteCount parameter than is the second file block.

At the conclusion of step 320, the one or more processors will have selected from Table 1 a subset of logical blocks of the parent clone or of the newly created child clone that are most likely to be updated, and that are thus most likely to require preallocated storage. In the running example described above, we refer to this subset as "CloneBlock-List."

In step 330, the one or more processors enumerates a child clone list that identifies all child clones that have been cloned from ParentClone. In some embodiments, information in this list may be read from an arbitrarily named "Table 2" that identifies each newly created child clone and associates it with its parent file. In such embodiments, a new entry may be created in Table 2 every time a child clone is created.

A possible record structure for a Table 2 entry is:

TABLE 2

| Parent File | Child Files |
|---|---|
| ParentClone | SourceFile1, Child1, Child2 |

In this example, the Table 2 entry shows that two child clones ("Child1" and "Child2") have been cloned from parent clone ParentClone. In some embodiments, as is shown in this example, the Table 2 entry associated with ParentClone may also list a source file from which ParentClone was itself cloned.

In the running example, the one or more processors in step 330 would thus enumerate a child clone list that identifies Child1 and Child2 as previously created child clones of parent clone ParentClone.

Step 340 begins an iterative process of steps 340-370, which is performed once for each file block or logical block of the CloneBlockList of volatile blocks created in step 320, where each such block is associated with one of the child files listed in an entry of Table 2 associated with ParentClone. Each iteration of this iterative process determines whether additional physical storage should be preallocated or reserved in order to store information identified by one block of CloneBlockList.

In step 350, the one or more processors identify a value of an AccessWeight parameter associated with the logical block being processed by the current iteration of the iterative process of steps 340-370.

A value of the AccessWeight parameter further identifies a probability that contents of a logical block associated with that value will be revised, and will thus at some point require allocation of a block of physical storage. In some embodiments, a value of AccessWeight associated with a first file, physical, or logical block may be similar or identical to a corresponding value of AccessWeight associated with the same block.

Like the WriteCount parameter, an AccessWeight value may be determined as a function of a frequency, of a number of times during a particular period of time, of a cumulative number of times, or of an other parameter related to volatility of information identified by a corresponding logical block of a child clone previously cloned from the same parent clone.

If, for example, ParentClone had previously been cloned twice to spawn child clone Child1 and child clone Child2, an AccessWeight value associated with file block FB1 of newly created Child3 might be identified as a function of how often block FB1 of Child1 and file block FB1 of Child2 have been updated over the past six months, or how often each instance of block FB1 in any source or cloned entity was updated during the 60-day period after its creation.

In some embodiments, however, a value of the WriteCount parameter may be derived by means of a different function or logged data than is a corresponding value of the AccessWeight parameter. In some cases, a value of a WriteCount parameter may be determined as a function of a corresponding WriteCount value.

In step 360, the one or more processors determine whether the AccessWeight value associated with the current logical block satisfies a set of conditions that identify whether that logical block is more likely or is less likely to be updated. Such conditions may be determined as a function of implementation-dependent factors known to those skilled in the art or may be determined arbitrarily by a person with expert knowledge of characteristics of components, systems, users, applications, operating environments, business requirements, or other relevant entities comprised by a particular embodiment.

In one example, an AccessWeight value associated with a file block FB002 of child clone Child1 might be determined by means of a function:

$$AccessWeight=(A*WriteCount(parent))+(B*PeerWeight)$$

Where WriteCount(parent) is a value of the WriteCount parameter associated with file block FB002 of the parent clone of Child1; PeerWeight is a value of a function that identifies a relative importance of peer child clones, of the file block, or of a relative number of access. In this example, A and B are arbitrary implementation-dependent coefficients that may be assigned by those with expert knowledge in order to produce more meaningful AccessWeight values.

In step 370, if the one or more processors determine that the AccessWeight value associated with the current block identifies that block as being likely to be updated, the one or more processors preallocate an additional physical block of storage for that logical block. In some embodiments, the one or more processors merely increment a preallocation-count variable or other tracking mechanism that counts a number of physical blocks that will need to be preallocated to the child clone in step 380.

If the one or more processors determine that the AccessWeight value associated with the current logical block identifies the block as being less likely to be updated, the one or more processors do not preallocate additional physical storage or increment the preallocation-count variable.

At the conclusion of the current iteration of the iterative process of steps 340-370, the one or more processors will have preallocated a block of physical storage, or will have incremented a preallocation count, for the current block of the newly created child clone if that logical block is likely to require additional physical storage. This likelihood is determined as a function of values of the WriteCount and AccessWeight parameters associated with past recorded volatility of that block in other related entities, such as the child's parent clone, other child clones of the same parent, or, in some embodiments, the original data source from which the parent clone was created.

The next iteration of the iterative process of steps 340-370 then begins in order to consider a next file block or logical of the newly created child clone. If all blocks of the child clone have been considered by the iterative process, the method of FIG. 3 then continues with step 380.

In step 380, if the one or more processors did not preallocate physical storage in prior iterations of step 370, the one or more processors preallocate a number of blocks of physical storage identified by the preallocation-count variable.

In some embodiments, a tally of the number of blocks of physical storage to be preallocated to the child clone, as created in steps 370 and 380, may be stored as metadata embedded in or otherwise associated with the newly created child clone. Each time a file block of the child clone (or its related logical block) is updated for the first time, the required additional physical block of storage will be available because it will have been preallocated in step 380. Furthermore, because all physical blocks preallocated to the newly created child clone in step 380 may be comprised by a single contiguous block of physical storage, or may be comprised by a single storage volume, embodiments of the present invention ensure that physical storage associated with the newly created child clone is not broken into noncontiguous blocks or split across multiple volumes.

At the conclusion of step 380, the one or more processors will have created a child clone of a parent clone, where the child clone is organized into a set of file blocks that each point to a corresponding logical block that is in turn associated with a corresponding physical block, and where each corresponding physical block stores data that is identified both by the file block and by a corresponding file block of the parent clone.

The one or more processors will also have preallocated a set of blocks of physical storage that are likely to be needed by the child over time as information identified by some or all of the child's logical blocks is updated. This likelihood is determined as a function of how often corresponding file blocks, logical blocks, or physical blocks of the parent clone, or of the source data entity, have been updated in the past (that is, as a function of values of the WriteCount parameter) or as a function of how often corresponding logical or physical blocks of other children cloned from the same parent file have been updated (that is, as a function of values of the AccessWeight parameter).

FIG. 4 is a flow chart that illustrates a method of updating file block of a child clone that was previously created in accordance with embodiments of the present invention. FIG. 4 comprises steps 410-460.

In step 410, the one or more processors receives a request from a user or from a software or hardware system component to update data identified by a file block FB01 of a child clone Child1 created by an embodiment of the present invention, or through a method of FIG. 3. As in step 210 of FIG. 2 and step 310 of FIG. 3, this request may be received by any means known to those skilled in the art.

In step 420, the one or more processors determine whether file block FB01 of Child1 identifies a distinct storage location or points to a corresponding file block FB01 comprised by a parent clone from which Child1 was spawned. As described above, such a pointer is possible within the context of the present invention only if both the child's FB01 block and the parent's FB01 block both identify a same stored data element. If the Child1 FB01 identifies information that is distinct from the information identified by the parent's FB01, then the two blocks cannot refer to the same physical block.

If the one or more processors determine that file block FB01 points to a corresponding file block FB01 comprised by the parent clone, then the method of FIG. 4 continues with steps 430-450. If the one or more processors determine that file block FB01 does not point to a corresponding file block FB01 of the parent clone, then the method of FIG. 4 skips steps 430-450 and proceeds directly to step 460.

In step 430, having determined that a new block of physical storage must be allocated to store the updated information identified by Child1's file block FB01, the one or more processors determine whether any available physical blocks remain in the list of physical blocks preallocated or reserved for Child1 in step 370 or 380 of FIG. 3.

If the one or more processors identify an available preallocated block, the method of FIG. 4 continues with step 440. If the one or more processors determine that no available preallocated blocks remain, the method of FIG. 4 continues with step 450.

In step 440, the one or more processors allocate or associate one of the available preallocated blocks with Child1 file block FB01. This will allow the updated data identified in step 410 to be stored in the allocated or associated available preallocated block.

In some embodiments, the one or more processors may attempt to select a physical block of the list of preallocated physical blocks such that the selected block is physically contiguous with other physical blocks previously allocated to other file blocks of Child1. In some embodiments, the one or more processors may attempt to select a physical block of the list of preallocated physical blocks such that the selected block is physically comprised by a same volume or storage device as are other physical blocks previously allocated to other file blocks of Child1.

In step 450, the one or more processors allocate a block of physical storage to the newly updated contents of Child1 file block FB01 through conventional means known to those skilled in the art. These conventional means may, for example, arbitrarily select a block from a pool of all existing storage locations available to the underlying operating system, or may follow other guidelines, such as selecting a block from a device that is the fastest available, that has a greatest amount of storage capacity, or that has a greatest amount of available storage.

At the conclusion of steps 410-450, the system will have allocated a block of physical to the newly updated file block FB01 of Child1. If FB01 had been updated in the past, a distinct block of physical storage will have already been associated with or allocated to Child1's FB01. If this is the first time that Child1's FB01 has been updated since Child1 was created, then one of the preallocated or reserved physical blocks created by a method of FIG. 3 will be allocated to Child1's FB01. If all of the preallocated or reserved physical blocks have been allocated to other file blocks of Child1, then the one or more processors allocate a new physical block in a conventional manner.

In step 480, the one or more processors store the updated Child1 FB01 data received in step 410. This data is written to the physical block allocated or associated with Child1's FB01 file block in previous steps of FIG. 4.

What is claimed is:

1. A method for maintenance of cloned computer data, the method comprising:
one or more processors of a computer system receiving a request to update a first data element of a first child clone,
Wherein the first child clone is a cloned copy of a parent clone,
Wherein the parent clone is a cloned copy of a source software image,
Wherein information comprised by the first child clone is organized into a set of child file blocks and information comprised by the parent clone is organized into a set of parent file blocks,
Wherein a first child file block of the set of child file blocks identifies the first data element and further identifies that the first data element is stored in a first block of physical storage of a set of physical blocks, and
Wherein a first parent file block of the set of parent file blocks identifies a second data element that is not distinct from the first data element and that is stored in a second block of physical storage of the set of physical blocks that is not distinct from the first block of physical storage;

the one or more processors identifying a first preallocated block of physical storage of the set of physical blocks that is large enough to store the updated first data element;

the one or more processors storing the updated first data element in the first pre-allocated block of physical storage; and the one or more processors updating the first child file block to identify that the updated first data element is stored in the first pre-allocated block of physical storage.

2. The method of claim 1, wherein all information comprised by the parent clone is read-only data.

3. The method of claim 1,

Wherein a preallocated area of physical storage comprises a set of reserved blocks of the set of physical blocks, Wherein the set of reserved blocks comprises the first preallocated block of physical storage, and Wherein the set of reserved blocks was selected by the one or more processors at a time concurrent with a time of creation of the first child clone.

4. The method of claim 3, wherein the one or more processors added the first preallocated block of physical storage to the set of reserved blocks in response to a determination that the first data element is likely to updated after the time of creation of the first child clone.

5. The method of claim 4, wherein the one or more processors determine that the first data element is likely to be updated by identifying that a frequency at which the first parent file block was updated in the past exceeds a predefined volatility threshold value.

6. The method of claim 4, wherein information comprised by the source software image is organized into a set of source file blocks, and wherein each source file block of the set of source file blocks is identical to a corresponding parent file block of the set of parent file blocks.

7. The method of claim 6, wherein a first source file block of the set of source file blocks is identical to the first parent file block, and wherein the one or more processors determine that the first data element is likely to be updated by identifying that a frequency at which the first source file block was updated prior to the time of creation of the first child clone exceeds a predefined volatility threshold value.

8. The method of claim 4, further comprising the one or more processors creating a set of additional child clones of the parent clone, wherein each additional child of the set of additional child clones contains information that is identical to that of the parent clone, wherein each additional child is organized into a set of additional child file blocks that is identical to the set of parent file blocks, wherein each additional child comprises a distinct first additional child file block of the set of additional child file blocks that is identical to the first parent file block, wherein each distinct first additional child file block identifies the second data element and further identifies that the second data element is stored in the second block of physical storage, and wherein the one or more processors determine that the first data element is likely to be updated by identifying that a frequency at which one or more of the distinct first additional child file blocks was updated, prior to the time of creation of the first child clone, exceeds a predefined volatility threshold value.

9. The method of claim 1, wherein the preallocated area of physical storage is a contiguous area of physical storage of a storage device.

10. The method of claim 1, wherein the preallocated area of physical storage is entirely stored on a single volume of a storage device.

11. The method of claim 1, further comprising providing at least one support service for at least one of creating, integrating, hosting, maintaining, and deploying computer-readable program code in the computer system, wherein the computer-readable program code in combination with the computer system is configured to the receiving, the identifying, the storing, and the updating.

12. A computer program product, comprising a computer-readable hardware storage device having a computer-readable program code stored therein, said program code configured to be executed by one or more processors of a computer system to implement a method for allocating storage for cloned data, the method for maintenance of cloned computer data, the method comprising:

one or more processors of a computer system receiving a request to update a first data element of a first child clone, Wherein the first child clone is a cloned copy of a parent clone, wherein the parent clone is a cloned copy of a source software image, Wherein information comprised by the first child clone is organized into a set of child file blocks and information comprised by the parent clone is organized into a set of parent file blocks, Wherein a first child file block of the set of child file blocks identifies the first data element and further identifies that the first data element is stored in a first block of physical storage of a set of physical blocks, and Wherein a first parent file block of the set of parent file blocks identifies a second data element that is not distinct from the first data element and that is stored in a second block of physical storage of the set of physical blocks that is not distinct from the first block of physical storage;

the one or more processors identifying a first preallocated block of physical storage of the set of physical blocks that is large enough to store the updated first data element;

the one or more processors storing the updated first data element in the first preallocated block of physical storage;

and the one or more processors updating the first child file block to identify that the updated first data element is stored in the first preallocated block of physical storage.

13. The computer program product of claim 12, wherein a preallocated area of physical storage comprises a set of reserved blocks of the set of physical blocks, wherein the set of reserved blocks comprises the first preallocated block of physical storage, and wherein the set of reserved blocks was selected by the one or more processors at a time concurrent with a time of creation of the first child clone.

14. The computer program product of claim 13, wherein the one or more processors added the first preallocated block of physical storage to the set of reserved blocks in response to a determination that the first data element is likely to updated after the time of creation of the first child clone.

15. The computer program product of claim 14, wherein the one or more processors determine that the first data element is likely to be updated by identifying that a frequency at which the first parent file block was updated in the past exceeds a predefined volatility threshold value.

16. The computer program product of claim 14, wherein information comprised by the source software image is organized into a set of source file blocks, wherein each source file block of the set of source file blocks is identical to a corresponding parent file block of the set of parent file blocks, wherein a first source file block of the set of source file blocks is identical to the first parent file block, and wherein the one or more processors determine that the first data element is likely to be updated by identifying that a frequency at which the first source file block was updated prior to the time of creation of the first child clone exceeds a predefined volatility threshold value.

17. A computer system comprising a processor, a memory coupled to said processor, and a computer-readable hardware storage device coupled to said processor, said storage device containing program code configured to be run by said processor via the memory to implement a method for allocating storage for cloned data, the method for maintenance of cloned computer data, the method comprising:

one or more processors of a computer system receiving a request to update a first data element of a first child clone, Wherein the first child clone is a cloned copy of a parent clone, wherein the parent clone is a cloned copy of a source software image, Wherein information comprised by the first child clone is organized into a set of child file blocks and information comprised by the parent clone is organized into a set of parent file blocks, Wherein a first child file block of the set of child file blocks identifies the first data element and further identifies that the first data element is stored in a first block of physical storage of a set of physical blocks, and Wherein a first parent file block of the set of parent file blocks identifies a second data element that is not distinct from the first data element and that is stored in a second block of physical storage of the set of physical blocks that is not distinct from the first block of physical storage;

the one or more processors identifying a first preallocated block of physical storage of the set of physical blocks that is large enough to store the updated first data element;

the one or more processors storing the updated first data element in the first preallocated block of physical storage; and the one or more processors updating the first child file block to identify that the updated first data element is stored in the first preallocated block of physical storage.

18. The computer system of claim 17, wherein a preallocated area of physical storage comprises a set of reserved blocks of the set of physical blocks, wherein the set of reserved blocks comprises the first preallocated block of physical storage, and wherein the set of reserved blocks was selected by the one or more processors at a time concurrent with a time of creation of the first child clone.

19. The computer system of claim 18, wherein the one or more processors added the first preallocated block of physical storage to the set of reserved blocks in response to a determination that the first data element is likely to updated after the time of creation of the first child clone.

20. The computer system of claim 19, wherein the one or more processors determine that the first data element is likely to be updated by identifying that a frequency at which the first parent file block was updated in the past exceeds a predefined volatility threshold value, wherein information comprised by the source software image is organized into a set of source file blocks, wherein each source file block of the set of source file blocks is identical to a corresponding parent file block of the set of parent file blocks, wherein a first source file block of the set of source file blocks is identical to the first parent file block, and wherein the one or more processors determine that the first data element is likely to be updated by identifying that a frequency at which the first source file block was updated prior to the time of creation of the first child clone exceeds a predefined volatility threshold value.

\* \* \* \* \*